United States Patent
Sanma et al.

(10) Patent No.: US 9,110,537 B2
(45) Date of Patent: Aug. 18, 2015

(54) IN-VEHICLE APPARATUS INCLUDING DISTORTION DETECTION ELEMENT

(71) Applicant: DENSO CORPORATION, Kariya, Aichi-pref. (JP)

(72) Inventors: Norio Sanma, Okazaki (JP); Shinji Hatanaka, Okazaki (JP); Toru Nada, Inazawa (JP); Kiyotaka Taguchi, Kariya (JP); Makoto Manabe, Chiryu (JP); Akira Yoshizawa, Koganei (JP); Makoto Obayashi, Kashiwa (JP)

(73) Assignee: DENSO CORPORATION, Kariya (JP)

( * ) Notice: Subject to any disclaimer, the term of this patent is extended or adjusted under 35 U.S.C. 154(b) by 132 days.

(21) Appl. No.: 13/759,127

(22) Filed: Feb. 5, 2013

(65) Prior Publication Data

US 2013/0222300 A1  Aug. 29, 2013

(30) Foreign Application Priority Data

Feb. 29, 2012  (JP) ................................. 2012-044198

(51) Int. Cl.
  *G06F 3/041* (2006.01)
  *B60K 37/06* (2006.01)

(52) U.S. Cl.
  CPC .............. *G06F 3/0418* (2013.01); *B60K 37/06* (2013.01); *B60K 2350/1024* (2013.01); *B60K 2350/928* (2013.01); *G06F 2203/04105* (2013.01)

(58) Field of Classification Search
  None
  See application file for complete search history.

(56) References Cited

U.S. PATENT DOCUMENTS

| 2003/0007261 A1* | 1/2003 | Hutzel et al. ................... 359/838 |
| 2008/0250894 A1 | 10/2008 | Fujiwara |
| 2009/0160789 A1* | 6/2009 | Kreit et al. ..................... 345/173 |
| 2009/0192677 A1* | 7/2009 | Cech et al. ....................... 701/41 |
| 2009/0192795 A1* | 7/2009 | Cech .............................. 704/233 |
| 2010/0045624 A1 | 2/2010 | Hisatsugu et al. |
| 2010/0156913 A1* | 6/2010 | Ortega et al. .................. 345/520 |
| 2010/0170349 A1 | 7/2010 | Hatanaka et al. |
| 2011/0181539 A1 | 7/2011 | Aono |
| 2012/0028682 A1* | 2/2012 | Danne ........................... 455/557 |

FOREIGN PATENT DOCUMENTS

| JP | 11-305941 A | 11/1999 |
| JP | 2007-232729 A | 9/2007 |
| JP | 2008-164421 A | 7/2008 |
| JP | 2008-249648 A | 10/2008 |
| JP | 2010080219 A * | 4/2010 |
| WO | 2013/128819 A1 | 9/2013 |

OTHER PUBLICATIONS

Search Report dated Dec. 13, 2013 issued in the corresponding GB patent application No. 1302633.1.
Office Action dated Sep. 15, 2014 issued in corresponding CN patent application No. 201310058707.3 (and English translation).

* cited by examiner

*Primary Examiner* — Grant Sitta
*Assistant Examiner* — Kirk Hermann
(74) *Attorney, Agent, or Firm* — Posz Law Group, PLC

(57) ABSTRACT

An in-vehicle apparatus includes a plurality of operations sections, a detection section, and a cancellation section. The operation sections are configured to receive an operation by a user while driving of a vehicle and respectively include distortion detection elements that respectively transmit detection signals in accordance with loads generated due to the operation. The detection section detects the operation to the operation sections based on the detection signals. The cancellation section determines whether loads are generated in the operation sections in a same period based on the detection signals transmitted from the distortion detection elements and cancels the detection signals transmitted from the distortion detection elements in the same period when the loads are generated in the same period.

7 Claims, 4 Drawing Sheets

IN-VEHICLE APPARATUS INCLUDING DISTORTION DETECTION ELEMENT

CROSS REFERENCE TO RELATED APPLICATIONS

The present application is based on and claims priority to Japanese Patent Application No. 2012-44198 filed on Feb. 29, 2012, the contents of which are incorporated in their entirety herein by reference.

TECHNICAL FIELD

The present disclosure relates to an in-vehicle apparatus including a distortion detection element.

BACKGROUND

JP-A-2010-181398 (corresponding to US 2010/0170349 A1) discloses an in-vehicle apparatus that detects a load applied to an operation portion with a distortion detection element and detects an operation applied to the operation portion by a user based on the load. Because the in-vehicle apparatus can detect a magnitude of a force applied to the operation portion, the in-vehicle apparatus can accept various operations.

However, a load may be generated in the operation portion due to a vibration of the vehicle, and thereby an operation of a user may be misdetected. Accordingly, a malfunction of in-vehicle apparatus may occur. In order to avoid the above-described issue, an operation detected by the distortion detection element at a time when a vibration of the vehicle occurs may be canceled. However, an additional component, such as an acceleration sensor, for detecting a vibration of the vehicle is required and a cost may increase.

SUMMARY

It is an object of the present disclosure to provide an in-vehicle apparatus that includes a plurality of operation sections each detecting an operation with a distortion detection element and can restrict a malfunction due to a misdetection of operation caused by a vibration of a vehicle with a simple configuration.

An in-vehicle apparatus according to an aspect of the present disclosure includes a plurality of operation sections, a detection section, and a cancellation section. The operation sections are configured to receive an operation by a user while driving of a vehicle. The operation sections respectively include distortion detection elements that respectively transmit detection signals in accordance with loads generated due to the operation. The detection section detects the operation to the operation sections based on the detection signals transmitted from the distortion detection elements. The cancellation section determines whether loads are generated in the operation sections in a same period based on the detection signals transmitted from the distortion detection elements and cancel the detection signals transmitted from the distortion detection elements in the same period when the loads are generated in the operation sections in the same period.

The in-vehicle apparatus can restrict a malfunction due to a misdetection of operation caused by a vibration of a vehicle with a simple configuration.

BRIEF DESCRIPTION OF THE DRAWINGS

Additional objects and advantages of the present disclosure will be more readily apparent from the following detailed description when taken together with the accompanying drawings. In the drawings.

DETAILED DESCRIPTION

Embodiments of the present disclosure will be described with reference to drawings. The embodiments of the present disclosure are not limited to the following embodiments and various changes and modifications can be made without departing from the scope of the disclosure as defined in the appended claims.

Figure 1:
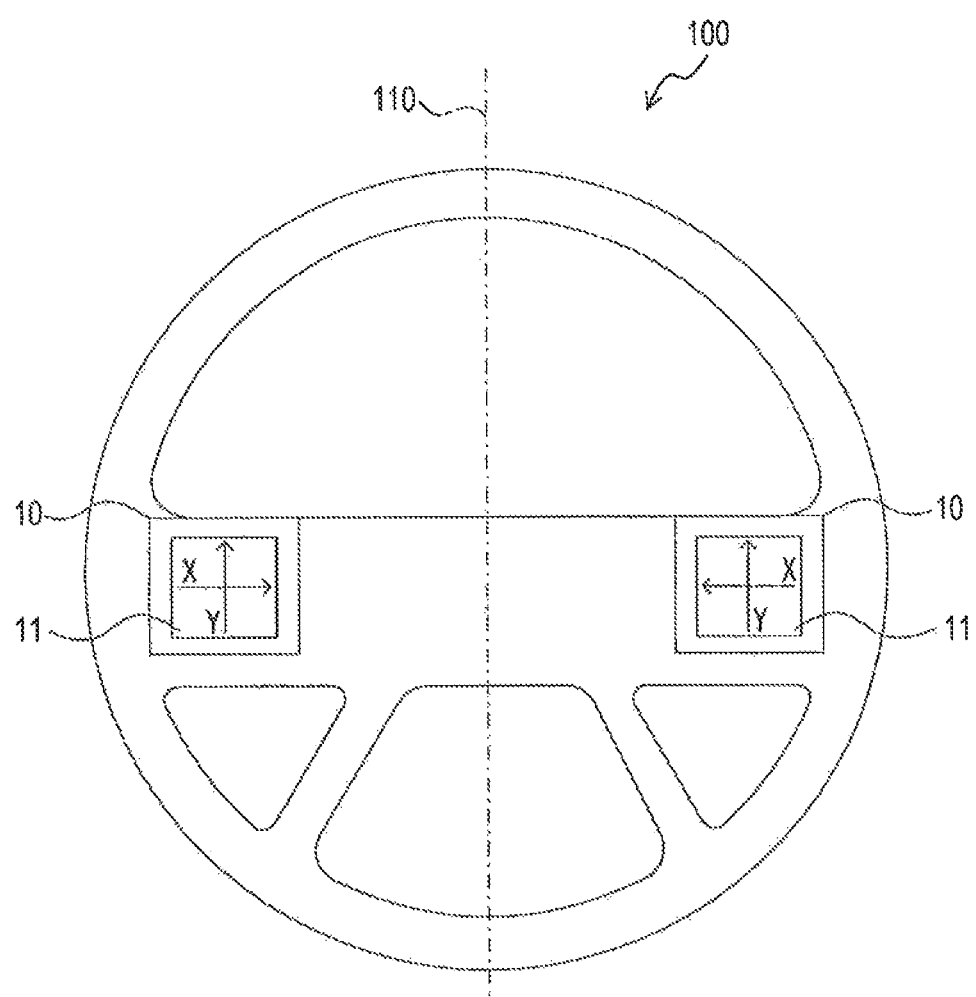
FIG. 1 is a diagram showing a steering attached with touch pads according to an embodiment of the present disclosure.
Figure 2:
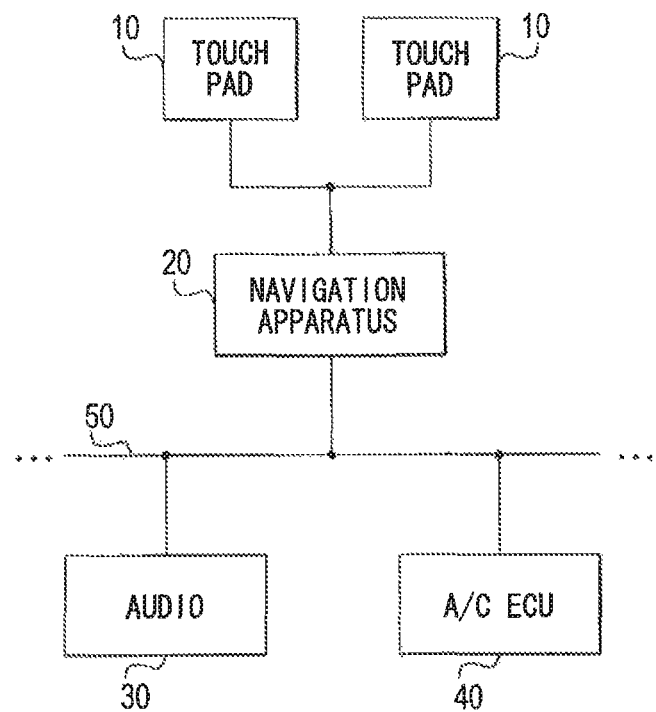
FIG. 2 is a block diagram showing a navigation apparatus including the touch pads and devices coupled with the navigation apparatus.

A navigation apparatus 20 according to an embodiment of the present disclosure includes two touch pads 10 attached to a steering 100 of a vehicle. As shown in FIG. 1, the touch pads 10 are attached to an upper spoke so as to be adjacent to a steering wheel. A driver can touch operation planes 11 with grabbing the steering wheel. In FIG. 2, the touch pads 10 are illustrated separately from the navigation apparatus 20 for convenience sake.

In a state in which a steering angle of the steering 100 is zero, the steering 100 is evenly divided by a center line 110 to a right section and a left section. One of the touch pads 10 is disposed in the right section (hereafter, referred to as the right touch pad 10), and the other of the touch pads 10 is disposed in the left section (hereafter, referred to as the left touch pad 10) so as to be line symmetric with respect to the center line 110, The right and left touch pads 10 have similar configurations. Components of the right and left touch pads 10 are disposed line symmetrically with respect to the center line 110. In other words, the right and left touch pads 10 are attached to the steering 100 in a manner similar to each other.

The positions of the right and left touch pads 10 with respect to the steering 100 are not limited to the above-described example. The touch pads 10 may be disposed at any right-to-left symmetric positions adjacent to the steering wheel or on the steering wheel.

The navigation apparatus 20 is coupled with an in-vehicle local area network (LAN) 50, which is also coupled with an audio 30 and electronic control units (ECUs), such as an air conditioner (A/C) ECU 40. By operating the touch pads 10, a driver can operate the navigation apparatus 20 and the ECUs coupled with the in-vehicle LAN 50.

Figure 3:
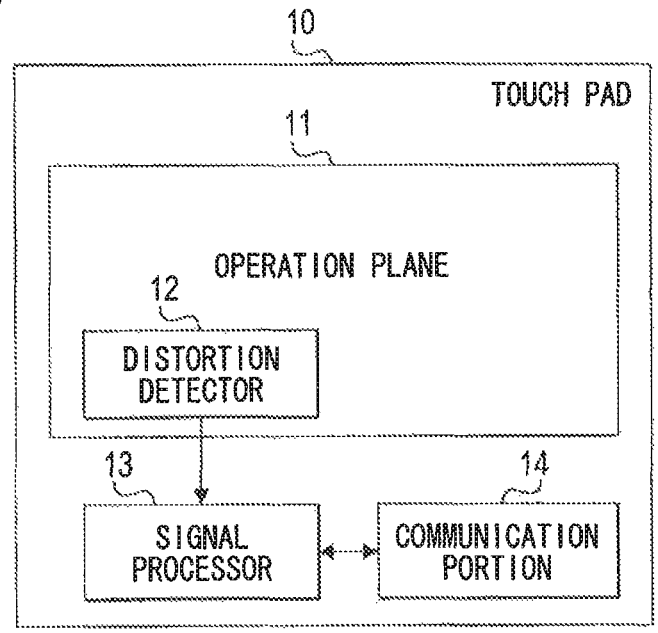
FIG. 3 is a diagram showing components of the touch pad.

As shown in FIG. 3, each of the touch pads 10 includes the operation plane 11 and the distortion detector 12. The operation plane 11 has a plate shape and receives a touch operation by the driver. The distortion detector 12 includes distortion detection elements 12a-12d. Each of the distortion detection elements 12a-12d detects a distortion generated due to a load applied to the operation plane 11 by the touch operation and transmits a detection signal in accordance with the distortion. Each of the touch pads 10 further includes a signal processor 13 and a communication portion 14. The signal processor 13 includes a signal processing circuit, such as a central processing unit (CPU), a read only memory (ROM), a random access memory (RAM), and an analog-to-digital (A/D) conversion circuit. The communication portion 14 communicates with a touch pad communication portion 23 in the navigation apparatus 20, which will be described later.

The signal processor 13 calculates the load (operation force) applied to the operation plane 11 by the touch operation based on the detection signals from the distortion detection elements 12a-12d in the distortion detector 12 by a known method. In addition, the signal processor 13 calculates an operation position in the operation plane 11 to which the touch operation is applied. Then, the signal processor 13 transmits operation information including the operation force and the operation position to the navigation apparatus 20 through the communication portion 14 at predetermined intervals (e.g., 100 ms).

The signal processor 13 detects the operation position with an X-Y coordinate system with an origin at a center of the operation plane 11. As shown in FIG. 1, on a Y-axis, an upper region on the basis of a state in which the steering angle of the steering 100 is zero is a positive region. On an X-axis, an inner region of the steering 100 is a positive region.

Figure 4:
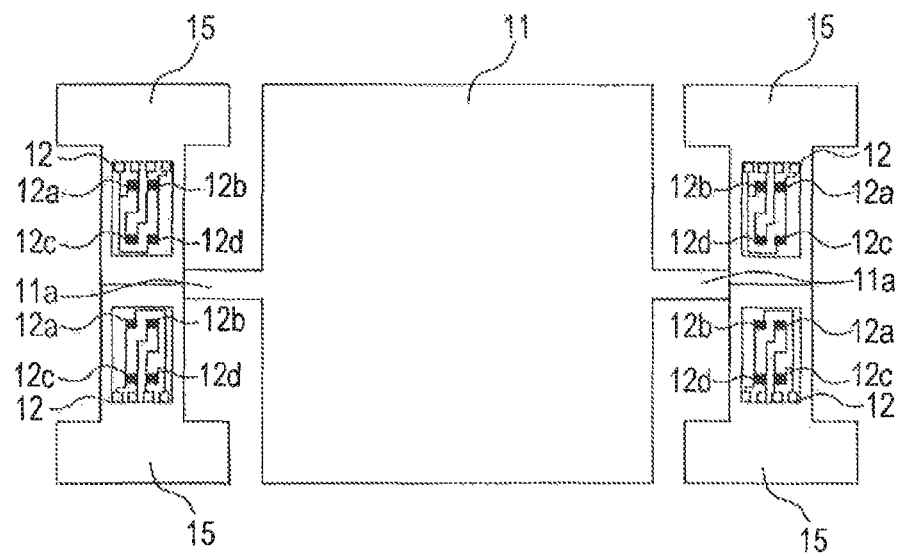
FIG. 4 is a top view showing an operation plane and distortion detectors included in the touch pad.

An example of configurations of the operation plane 11 and the distortion detector 12 will be described. As shown in FIG. 4, the operation plane 11 has an approximately rectangular plate shape. Two protruding portions 11a respectively protrude rightward and leftward from a peripheral end of the operation plane 11. The protruding portions 11a are opposite to each other through the operation plane 11.

Through each of the protruding portions 11a, two distortion generators 15 having plate shapes are opposite to each other. One end of each of the distortion generators 15 is coupled with the protruding portion 11a, and the other end of each of the distortion generators 15 is coupled with a casing (not shown) of the touch pad 10.

The distortion generators 15 are disposed substantially in parallel with the operation plane 11. A front side of each of the distortion generators 15, which corresponds to a side of the operation plane 11 that receives the touch operation, is a displacement transmission surface that elastically deforms to generate a bending deformation in accordance with the application of the operation force to the operation plane 11.

On the displacement transmission surface, the distortion detector 12 is disposed. Each of the distortion detection elements 12a-12d detects a displacement (elastic deformation amount) of the displacement transmission surface as a distortion and transmits the detection signal to the signal processor 13 in accordance with the distortion.

Figure 5:
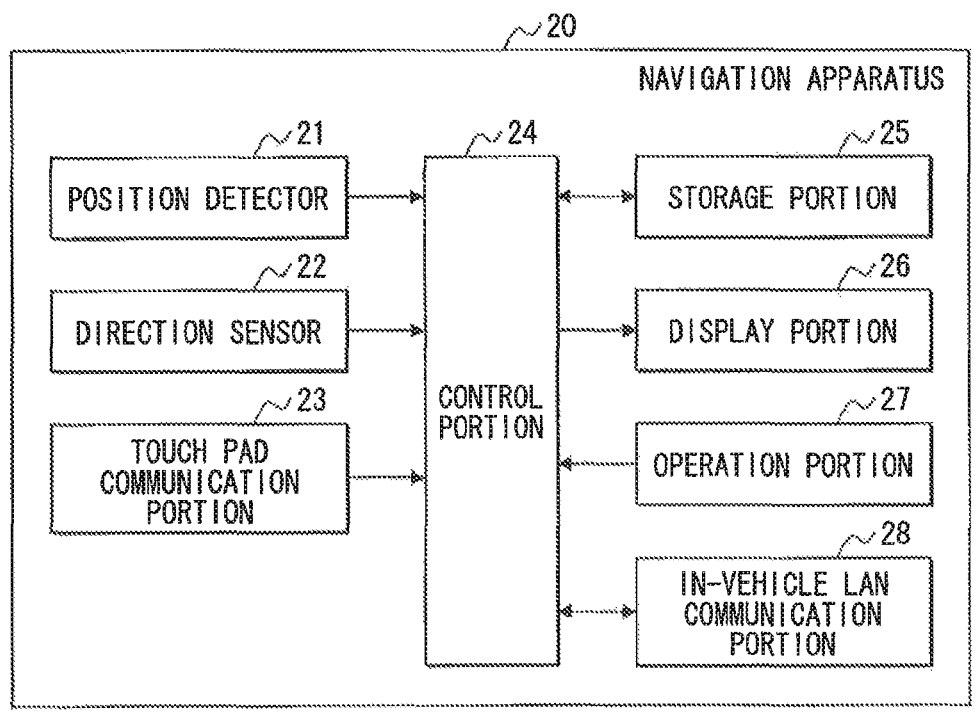
FIG. 5 is a block diagram showing components of the navigation apparatus.

As shown in FIG. 5, the navigation apparatus 20 further includes a position detector 21, a direction sensor 22, and the touch pad communication portion 23. The position detector 21 detects a current position of the vehicle. The direction sensor 22 detects an absolute direction based on geomagnetism. The touch pad communication portion 23 communicates with the right and left touch pads 10. The navigation apparatus 20 further includes a control portion 24. The control portion includes a microcomputer that includes a CPU, a ROM, a RAM, an input and output part (I/O), and a bas line coupling the CPU, the ROM, the RAM and the I/O. The control portion 24 performs an overall control of the navigation apparatus 20 based on a program loaded to the RAM. The navigation apparatus 20 further includes a storage portion 25 and a display portion 26. The storage portion 25 includes, for example, a hard disk drive or a flash memory and stores, for example, a map data. The display portion 26 includes, for example, a liquid crystal display, and displays various kinds of information. The display portion 26 may be integrally disposed with a meter indicator in a dashboard or may be a head up display.

The navigation apparatus 20 further includes an operation portion 27 and an in-vehicle LAN communication portion 28. The operation portion 27 includes, for example, a key switch or a touch switch, and receives various operations. The in-vehicle LAN communication portion 28 communications with the ECUs through the in-vehicle LAN 50.

Next, an operation of the navigation apparatus 20 according to the present embodiment will be described. The control portion 24 in the navigation apparatus 20 performs various processes in accordance with the operation information transmitted from the signal processors 13 in the right and left touch pads 10. In addition, the control portion 24 transmits the operation information to the ECUs through the in-vehicle LAN 50 as necessary. Accordingly, the navigation apparatus 20, the audio 30, and the ECUs, such as the air conditioner ECU 40, can be operated through the touch pads 10.

As described above, each of the touch pads 10 attached to the steering 100 is a load detection touch pad that detects the touch operation to the operation plane 11 by detecting the load generated in the operation plane 11 with the distortion detector 12. Thus, when a load is generated in the operation plane 11 due to a vibration of the vehicle, a touch operation may be misdetected.

When a vibration of the vehicle occurs, loads having similar magnitudes and similar directions are applied to the operation planes 11 in the right and left touch pads 10 in a same period. As described above, the right and left touch pads 10 have the similar configurations and are attached to the steering 100 in the manner similar to each other. In addition, in the X-Y coordinate system on the operation plane 11 of each of the touch pads 10, the positive directions of the X-axis and the Y-axis are determined so as to be right-left symmetric with reference to the center line 110 of the steering 100.

Thus, when loads having similar magnitudes and similar directions are applied to the right and left touch pads 10, the signal processor 13 detects similar operation amounts and operation positions close to each other.

Thus, when the operation amounts included in the operation information about the touch operations applied to the right and left touch pads 10 in the same period have similar magnitudes, and the operation positions included in the operation information are close to each other, the navigation apparatus 20 cancels the operation information.

Figure 6:
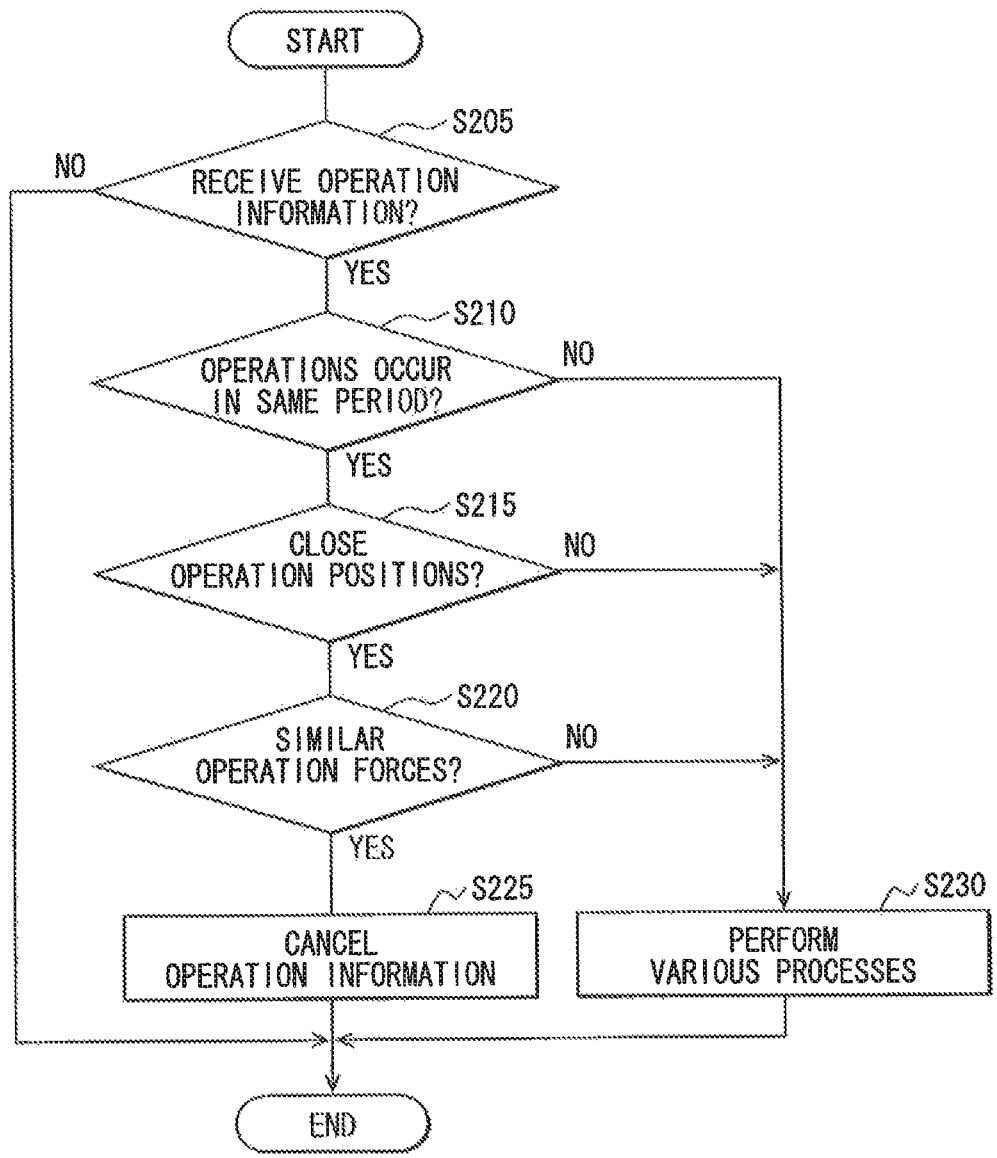
FIG. 6 is a flowchart showing an operation information reception process.

An operation information reception process performed by the navigation apparatus 20 will be described with reference to FIG. 6. In the operation information reception process, the navigation apparatus 20 performs various processes based on the operation amounts and the operation positions detected at the right and left touch pads 10 and cancels the operation amounts and the operation positions misdetected due to a vibration of the vehicle. The navigation apparatus 20 performs the operation information reception process at predetermined intervals, for example, 100 ms.

At S205, the control portion 24 of the navigation apparatus 20 determines whether the touch pad communication portion 23 receives new operation information from the right and left touch pads 10. If the determination at S205 results in YES, the process proceeds to S210. If the determination at S205 results in NO, the process ends.

At S210, the control portion 24 determines whether the touch operations to the right and left touch pads 10 occur in a same period. When the touch pad communication portion 23 receives the new operation information from both of the touch pads 10, the control portion 24 may determine that the touch operations corresponding to the operation information occur in the same period. If the determination at S210 results in YES, the process proceeds to S215. If the determination at S210 results in NO, the process proceeds to S230.

At S215, the control portion 24 determines whether the operation positions included in the operation information transmitted from the right and left touch pads 10 are close to each other. For example, the control portion 24 determines whether a difference between X-coordinates and a difference between Y-coordinates of the operation positions are less than or equal to a predetermined threshold value. If the determination at S215 results in YES, the process proceeds to S220. If the determination at S215 results in NO, the process proceeds to S230.

At S220, the control portion 24 determines whether the operation forces included in the operation information transmitted from the right and left touch pads 10 are similar to each other. For example, the control portion 24 determines whether a difference between magnitudes of the operation forces is less than or equal to a predetermined threshold value. If the determination at S220 results in YES, the process proceeds to S225. If the determination at S220 results in NO, the process proceeds to S230.

At S225, the control portion 24 determines that the touch operations of the touch pads 10 are misdetected due to a vibration of the vehicle and cancels the operation information transmitted from the right and left touch pads 10. Then, the process ends.

On the other hand, at S230, the control portion 24 performs various processes based on the operation forces and the operation positions included in the operation information. Then, the process ends.

The navigation apparatus 20 according to the present embodiment includes the right and left touch pads 10 attached to the steering 100. The right and left touch pads 10 detect the touch operation of the driver with the distortion detection elements 12a-12d. The navigation apparatus 20 performs various processes in accordance with the operation positions and the operation forces included in the operation information transmitted from the right and left touch pads 10. In addition, the navigation apparatus 20 transmits the operation information to the ECUs as necessary. Accordingly, the navigation apparatus 20 and the ECUs can be operated by using the right and left touch pads 10.

When the right and left touch pads 10 detect the operation positions and the operation forces in the same period, the operations positions are close to each other, and the magnitudes of the operation forces are similar to each other, the navigation apparatus 20 cancel the operation positions and the operation forces.

Thus, the navigation apparatus 20 can cancel the touch operation of the touch pads 10 misdetected due to the load generated by the vibration of the vehicle, without additional component for detecting the vibration of the vehicle. Accordingly, a malfunction of the navigation apparatus 20 and the ECUs due to the vibration of the vehicle can be restricted with a simple configuration while restricting increase in cost.

Furthermore, the driver can operate the navigation apparatus 20 and the ECUs with grabbing the steering 100. Therefore, a convenience can be improved with restricting a malfunction of the navigation apparatus 20 due to the vibration of the vehicle.

Furthermore, the two touch pads 10 having similar configurations are attached to the same component (the steering angle 100) in a manner similar to each other. Thus, compared with a case in which the two touch pads 10 are attached to different components, the two touch pads 10 are likely to receive loads having similar characteristics when a vibration of the vehicle occurs. Thus, the touch operation misdetected due to the vibration of the vehicle can be canceled with a high degree of accuracy.

In the above-described embodiment, the two touch pads 10 are attached to the steering 100 as an example to explain the process of canceling the touch operations misdetected due to the vibration of the vehicle. Also when three or more touch pads 10 are attached to the steering 100, or when the touch pads 10 are attached to other component, a misdetected touch operation can be canceled by performing similar determinations based on the operation forces and the operation positions detected by the touch pads 10 in the same period.

In a manner similar to the touch pads 10, an operation reception device that detects an operation by a user with a distortion detection element has a possibility to misdetect an operation due to a vibration of the vehicle. Thus, also in a case in which a plurality of operation reception devices are attached to, for example, the steering 100, the misdetected operation can be canceled by performing similar determinations based on operations detected by the operation reception devices in a same period.

In the above-described embodiment, the two touch pads 10 have similar configurations and are attached to the steering 100 in the manner similar to each other. However, even when the touch pads 10 are attached in different manners or when a plurality of touch pads 10 or a plurality of operation reception devices having different configurations are attached to the steering 100, an operation that is misdetected due to a vibration of the vehicle can be canceled. Even when a plurality of touch pads 10 or a plurality of operation reception devices is attached to different components of the vehicle, an operation that is misdetected due to a vibration of the vehicle can be canceled.

In the above-described case, it may be previously studied what kind of operations are detected at touch pads 10 or the operation reception devices when loads having similar magnitudes and similar directions are generated. In addition, data indicating combinations of the operations detected at the touch pads 10 or the operation reception devices may be stored in the storage portion 25 in the navigation apparatus 20.

Then, when the operations detected at the touch pads 10 or the operation reception devices in a same period correspond to the combination of the operations included in the data, the control portion 24 may cancel the operations. Also in the above-described cases, a malfunction of the navigation apparatus 20 and the ECUs due to the vibration of the vehicle can be restricted.

In the operation information reception process in the above-described embodiment, the control portion 24 of the navigation apparatus 20 cancel the operation that is misdetected due to the vibration of the vehicle, based on the operation information transmitted from the touch pads 10.

However, it is not limited to the above-described example, and the detection signals from the distortion detectors 12 in the touch pads 10 may be directly input to the control portion 24 in the navigation apparatus 20, and the control portion 24 may detect the touch operation to the touch pads 10 based on the detection signals.

In addition, the navigation apparatus 20 may include a determination circuit that determines whether waveforms of the detection signals transmitted to the navigation apparatus 20 from the distortion detectors 12 in a same period are similar to each other. When the waveforms are similar to each other, the determination circuit may determine that the detection signals are transmitted due to the vibration of the vehicle and may output an abnormal signal to the control portion 24.

Then, when the control portion 24 receives the abnormal signal from the determination circuit, the control portion may cancel the touch operation.

Also in the above-described case, a malfunction of the navigation apparatus 20 and the like due to the touch operation that is misdetected due to the vibration of the vehicle can be restricted.

In the operation information reception process in the above-described embodiment, the operation information is canceled when the operation positions included in the operation information transmitted from the right and left touch pads 10 in a same period are close to each other and the magnitudes of the operation forces included in the operation information are similar to each other.

However, the operation information may be canceled when the operation positions included in the operation information transmitted from the right and left touch pads 10 in a same period are close to each other or when the magnitudes of the operation forces included in the operation information transmitted from the right and left touch pads 10 in a same period are similar to each other. The operation information may also be canceled when the operation information is transmitted from the right and left touch pads 10 in a same period regardless of other conditions.

According to the above-described configurations, a malfunction of the navigation apparatus 20 and the like due to a vibration of the vehicle can be restricted with simple configurations.

In the above-described embodiments, the navigation apparatus 20 can operate as an in-vehicle apparatus. The touch pads 10 can operate as an operation section. The signal processor 13 can operate as a detection section. The processes at S210 to S225 in the operation information reception process may be performed by a cancellation section.

What is claimed is:

1. An in-vehicle apparatus comprising:
a plurality of operation sections configured to receive an operation by a user while driving of a vehicle, the plurality of operation sections respectively including distortion detection elements that respectively transmit detection signals in accordance with loads generated due to the operation;
a detection section detecting the operation to the plurality of operation sections based on the detection signals transmitted from the distortion detection elements; and
a cancellation section determining whether loads are generated in the plurality of operation sections in a same period based on the detection signals transmitted from the distortion detection elements and canceling the detection signals transmitted from the distortion detection elements in the same period when the loads are generated in the plurality of operation sections in the same period,
wherein the cancellation section determines whether loads having similar magnitudes and similar directions are generated in the plurality of operation sections in the same period based on the detection signals transmitted from the distortion detection elements and cancels the detection signals transmitted from the distortion detection elements in the same period when the loads having similar magnitudes and similar directions are generated in the same period,
wherein the cancellation section determines that the loads have similar magnitudes when a difference between the magnitudes of the loads is less than or equal to a predetermined threshold value.

2. The in-vehicle apparatus according to claim 1, wherein the plurality of operation sections is attached to a steering wheel of the vehicle.

3. The in-vehicle apparatus according to claim 1, wherein the operation sections respectively include operation planes configured to receive a touch operation by the user, and the distortion detection elements respectively transmit the detection signals in accordance with the loads generated due to the touch operation,
wherein the detection section detects magnitudes of the loads generated in the operation planes due to the touch operation and operation positions in the operation planes to which the touch operation is applied, based on the detection signals transmitted from the distortion detection elements, and
wherein the cancellation section cancels the detection signals transmitted from the distortion detection elements in the same period when the detection section detects the magnitudes of the loads and the operation positions due to the touch operation to the operation planes in the plurality of operation sections in the same period, and the magnitudes of the loads or the operations positions satisfy a predetermined condition.

4. The in-vehicle apparatus according to claim 1, wherein the plurality of operation sections respectively including the distortion detection elements have similar configurations.

5. The in-vehicle apparatus according to claim 2, wherein the plurality of operation sections is disposed in line symmetrically with respect to a center line of the steering wheel.

6. The in-vehicle apparatus according to claim 1, wherein the plurality of operation sections comprise left and right touch pads adapted to be separated and positioned to be touched by the user when the user is driving the vehicle, and
the detection signals which are canceled are generated from the distortion detection elements in the left and right touch pads in the same period.

7. An in-vehicle apparatus comprising:
a plurality of operation sections configured to receive an operation by a user while driving of a vehicle, the plurality of operation sections respectively including distortion detection elements that respectively transmit detection signals in accordance with loads generated due to the operation;
a detection section detecting the operation to the plurality of operation sections based on the detection signals transmitted from the distortion detection elements; and
a cancellation section determining whether loads are generated in the plurality of operation sections in a same period based on the detection signals transmitted from the distortion detection elements and canceling the detection signals transmitted from the distortion detection elements in the same period when the loads are generated in the plurality of operation sections in the same period,
wherein the cancellation section determines whether loads having similar magnitudes and similar directions are generated in the plurality of operation sections in the same period based on the detection signals transmitted from the distortion detection elements and cancels the detection signals transmitted from the distortion detection elements in the same period when the loads having similar magnitudes and similar directions are generated in the same period, wherein the operation sections respectively include operation planes configured to receive a touch operation by the user, and the distortion detection elements respectively transmit the detection signals in accordance with the loads generated due to the touch operation, wherein the detection section detects magnitudes of the loads generated in the operation planes due to the touch operation and operation positions in the operation planes to which the touch operation is applied, based on the detection signals transmitted from the distortion detection elements, and wherein the cancellation section cancels the detection signals transmitted from the distortion detection elements in the same period when the detection section detects the magnitudes of the loads and the operation positions due to the touch operation to the operation planes in the plurality of operation sections in the same period, and the magnitudes of the loads or the operations positions satisfy a predetermined condition.

\* \* \* \* \*